2,970,084

PRODUCTION OF CITRIC ACID BY FERMENTATION

Leonard B. Schweiger, Elkhart, Ind., assignor to Miles Laboratories, Inc., Elkhart, Ind., a corporation of Indiana No Drawing. Filed Jan. 21, 1958, Ser. No. 710,202

8 Claims. (Cl. 195—36)

This invention relates to the production of citric acid by submerged fermentation, with *Aspergillus niger*, of a carbohydrate-containing substrate, and is particularly concerned with such a fermentation process wherein the components of the substrate are not highly purified, whereby iron as an impurity is present in the substrate in more than the minimal amounts which have been found useful for suitable growth of the *Aspergillus niger*.

It is known that, under the conditions prevailing in the production of citric acid with *Aspergillus niger* under submerged conditions, trace quantities of iron in the substrate serve a useful function as a growth factor in the early stages of the fermentation, i.e., within the initial period of about 50 hours after inoculation of the substrate with spores of the organism, the iron being instrumental in promoting the generation of cellular material capable of converting the carbohydrate to citric acid at a high degree of efficiency. However, when iron is present in the substrate in greater than such minimal amounts its effect on the development of the organism is such that cellular material of the type which utilizes the carbohydrate primarily for mycelial growth is produced, with the result that the production of citric acid is adversely affected, and may be entirely inhibited, depending upon the amount of iron present in the substrate. My experience has shown that the amount of iron which may be present in the substrate without adversely affecting the cellular metabolism of the *Aspergillus niger* (as far as its ability to produce citric acid is concerned) varies somewhat with the nature of the substrate. More specifically, I have found that the effects of iron on the production of citric acid varies with the degree of refinement of the carbohydrate material.

For example, with substrates prepared from highly refined carbohydrate material, such as the refined sucrose derived from sugar cane and of the grade sold for human consumption, satisfactory yields of citric acid (i.e., greater than 70% conversion) may be obtained by submerged fermentation even with the iron content of the substrate as high as 2.0 parts per million (p.p.m.). However, with substrates prepared from relatively impure carbohydrate material, such as glucose, starch hydrolyzates, invert sugars, aqueous vegetable extracts containing sugar, and partially refined sucrose sources, as little as 0.2 p.p.m. of iron in the substrate may be sufficient to promote the generation of large amounts of non-acid-producing cells of the *Aspergillus niger*, with the result that little or no citric acid may be formed. This variance in the effect of iron on submerged fermentations carried out with substrates prepared with pure carbohydrate materials, as compared with its effect on submerged fermentations using substrates prepared with impure carbohydrates, is believed to be due to the presence of materials which may be referred to as "iron potentiators," which are believed to be amino acid moieties, partial enzyme systems, intermediate metabolites, and the like. These iron potentiators are believed to function in a way which enhances the action of the iron in promoting a non-acid-producing cellular metabolism.

I have found that the aforementioned deleterious effects of iron in submerged fermentations may be avoided by providing copper supplied in ionic form in the substrate during the period after inoculation when the fermenting organism is attaining its growth (i.e., during the initial period of about 50 hours after inoculation), the copper being supplied in an amount effective to counteract the undesirable effects of the iron present, as will be described more fully hereinafter. When used in this way, the copper appears to exert an antagonistic effect toward the iron and to alter the enzyme system of the *Aspergillus niger*, whereby the organism utilizes the carbohydrate for the production of citric acid rather than in building mycelium.

I am aware that the presence of copper in substrates used in the production of citric acid by submerged fermentation is not new per se. Representative of the prior art is the work described by Shu and Johnson in Jour. Bact., 54, August 1947, pp. 161–167, and in Ind. & Eng. Chemistry, July 1948, pp. 1202–1205, concerning laboratory fermentations using a substrate containing 0.06 p.p.m. copper and 1.3 p.p.m. iron and various other cations. However, the carbohydrate source used by those authors in preparing the substrate was a highly purified sugar ("Domino" brand sucrose) substantially free of the aforementioned "iron potentiators," and therefore the 1.3 p.p.m. of iron in the substrate was not sufficient, acting alone, to have any appreciable adverse effect on the cellular metabolism of the fermenting organism. Accordingly, the problem of overcoming the deleterious effects of iron on cellular metabolism of *Aspergillus niger* in fermentations using substrates containing iron potentiators, was not involved in the Shu and Johnson work, and the copper present in their substrate served primarily the function of a nutrient for the organism.

The prior art, therefore, while recognizing some value in trace amounts of copper as a growth factor for *Aspergillus niger*, did not recognize the value of copper as an iron antagonist in submerged fermentations of substrates made up from impure carbohydrate sources. This discovery, which forms the basis of the present invention, is of great importance since, through its use, relatively inexpensive impure carbohydrate sources may be used in preparing the substrate. Inasmuch as the carbohydrate material is present in the greatest proportion of all the components of the substrate, the economy resulting from the use of inexpensive carbohydrate sources, rather than the expensive pure carbohydrate materials required by the submeged fermentation processes of the prior art, is very considerable, and renders the present process competitive with the commonly used surface fermentation methods.

It is an object of the invention to provide a novel method of producing citric acid in high yield by submerged fermentation with *Aspergillus niger*, wherein the carbohydrate for the substrate is derived from an impure source and contains objectionable amounts of iron.

A more particular object is to provide a submerged fermentation method for producing citric acid in high yield using a substrate containing more than 0.2 p.p.m. of iron and prepared with carbohydrate obtained from an impure source.

A further object is to provide a submerged fermentation method for producing citric acid in high yield, using impure carbohydrate material as a component of the substrate, without the necessity of removing iron carried into the substrate as an impurity.

An additional object is to effect a successful fermentation of impure carbohydrate material with *Aspergillus niger* to produce citric acid in high yield, by employing ionic copper in the substrate to control the effects of iron on cellular metabolism of the organism.

As has been stated above, relatively large amounts of iron may be present in a substrate prepared from pure carbohydrate materials without having an adverse effect on the cellular metabolism of the organism. The invention, therefore, is limited to fermentation processes wherein the carbohydrate component of the substrate is obtained from an impure source such as glucose, starch hydrolyzates, invert sugars, aqueous vegetable extracts containing sugar, and partially or incompletely refined sucrose. Examples of commercially available carbohydrate sources which are contemplated as raw materials for the present process include the various corn sugars, beet sugar, beet sugar molasses, potato sugar, various vegetable extracts such as corn syrup, high test syrup, beet juice, pineapple juice, beet diffusion liquors and the like, and partially refined sucrose such as brown sugar, affination sugar, etc. High test syrup is the preferred carbohydrate source. However, Cerelose (commercial grade glucose), No. 70 corn sugar, beet molasses and blackstrap molasses are also highly regarded as carbohydrate sources.

The cellular morphology of *Aspergillus niger* which is non-acid-producing, and the morphology which is capable of converting carbohydrates to citric acid with great efficiency, are both shown and described in United States Patent 2,492,667. Briefly, the acid-producing cell structure is characterized by: (*a*) abnormally short, stubby, forked, bulbous mycelium; (*b*) numerous swollen, oval to spherical-shaped cells well distributed throughout the mycelial structure; (*c*) mycelial structures all showing granulation, and numerous vacuoles or refractile bodies; (*d*) absence of normal reproductive bodies (vesicles or sterigmata); (*e*) formation of compact aggregates or colonies having a gross granular appearance. In the non-acid-producing cell structure the growth of the mycelium is loose and filamentous with hyphae of little or no branching and tending to be pointed at the tips, with few or no chlamydospores in the mycelium. The difference in cellular morphology associated with acid-producing and non-acid-producing metabolism provides the most convenient fermentation control measure for determining the necessary copper additions for any substrate.

The amount of copper added to the substrate, in accordance with my invention, is dependent not only on the amount of iron present in the substrate and upon the degree of purity of the substrate components, but also upon the time when the copper is added to the substrate. As has been stated above the effect of iron in promoting a non-acid-producing cellular metabolism of the fermenting organism varies with the degree of purity of the carbohydrate material; i.e., this effect is increased with increasing concentrations of the iron potentiators aforementioned. As a corollary to this finding, I have observed that a given quantity of iron will require a lower concentration of copper to counteract its deleterious effects when present in a relatively pure medium than when in a relatively impure medium.

Concerning the effect of time of addition of copper to the substrate, I have observed that, in treating a substrate containing a given amount of iron, a smaller amount of copper will be required if added at the time of inoculation of the substrate with the spores of the fermenting organism than if the copper is added after the fermentation has proceeded for several hours. In general, therefore, the amount of copper required for counteracting a given amount of iron will be related to both the concentration of the impurities in the substrate, and the time elapsed between spore inoculation and the copper addition.

I have also found that the morphology and metabolic system of the organism are irrevocably established during the aforementioned initial growth period of about 50 hours immediately following inoculation of the medium or substrate with spores of the organism. Therefore, the entire amount of copper required for counteracting the undesirable effects of the iron in the substrate must be added during this period of growth of the organism. If, after the initial period of growth of the organism has passed, the morphology and metabolism of the *Aspergillus niger* are such that its cells are of the non-acid-producing type, further copper additions, no matter how large, will not be effective to change the physiology to the acid-producing type.

In practicing the invention it is preferable, prior to commencing the fermentation, to ascertain approximately the degree of purity of the carbohydrate material used in preparing the medium, and to analyze the medium to determine the concentration of iron therein. The copper is then added to the medium in an amount determined by the purity and iron content of the medium, as described more fully hereinafter, the copper addition preferably being made at the time of inoculation of the medium with spores of the *Aspergillus niger*. In repetitive operations in which fermentations are conducted frequently, using familiar carbohydrate solutions for preparing the medium or substrate, it is a simple matter to estimate very closely the amount of copper required to be added at the time of inoculation to condition the substrate for satisfactory fermentation. If too little copper is added in the first instance, further copper additions may be made as the fermentation progresses, to bring about the development of the desired cellular metabolism of the organism. As was stated above, however, the influence of copper on the metabolic activities of *Aspergillus niger* is manifested only during the initial period of growth of the organism (i.e., about 50 hours immediately following inoculation) and, accordingly, the growth of the organism should be examined at intervals of about 12 hours during the initial growth period to ascertain whether growth is progressing as desired and, if not, to make a further addition of copper. For example, if after about 12 hours after inoculation, examination of the organism shows its mycelium to be loose and filamentous with its hyphae of little or no branching and tending to be pointed at the tips, and if few or no chlamydospores appear in the mycelium, a further addition of copper is indicated. About 12 hours after such second adidtion of copper, a further examination of the organism is made and, if the cellular structure does not show the desired short, stubby, forked, bulbous mycelium (and other characteristics of the acid-producing structure aforementioned) a still further addition of copper is made. Further such examinations and, if necessary, additions of copper, may be made during the initial period of about 50 hours after inoculation, during which the growth of the organism and its characteristics are determined. A mycologist familiar with the cell structure desired as defined above, knowing the effect of copper described above, and knowing also the aforementioned influence of impurities in the substrate and the influence of time elapsing between spore inoculation and the copper addition, would have no difficulty in determining the necessary copper additions to carry out a successful fermentation. Other methods of determining copper requirements will be obvious to those skilled in the art.

It is sometimes necessary or desirable to subject certain impure sugars to a preliminary defecation and decationization treatment to reduce the ash components and colored impurities in order to produce a purer final product. Such preliminary treatment, of course, removes part of the iron and a considerable portion of the iron potentiators present in the original sugar supply. However, I have found that such preliminary defecation and decationization treatment does not remove all the iron or iron potentiators from the sugar solution, and the small amounts of iron and iron potentiators which remain are sufficient, acting tgether, to render the treated sugar unsuitable, without the addition of ionic copper, for use in submerged fermentations. The process of the invention, therefore, retains its commercial value even in those instances where the carbohydrate source is given a defecation and decationization treatment prior to its incorporation in the substrate.

The ionic copper used in the present process is in its higher valence state, i.e., in the cupric form. However, it may be added to the substrate in cuprous form if desired inasmuch as, under the conditions prevailing during the fermentation, the cuprous ions are quickly oxidized to cupric form. Cupric sulfate ($CuSO_4 \cdot 5H_2O$) is preferred as the source of copper ions because it is readily available in relatively pure form at reasonable cost. However, other copper salts such as cupric nitrate, cuprous chloride, cupric chloride, cuprous cyanide, cupric acetate, cuprous iodide, cupric carbonate, etc., may be used instead, if desired. The copper is added to the fermentation medium or substrate in the form of an aqueous solution of the copper salt in order to facilitate distribution of the copper ions throughout the medium.

The following examples demonstrate the utility of the present process and illustrate the manner in which it may be practiced. The fermentation conditions and methods of analysis employed were the same as those described in the aforementioned United States Patent 2,494,667, unless otherwise stated herein. The strain of *Aspergillus niger* used in the examples was a wild strain designated 18B$_2$ and ultraviolet irradiated mutants thereof, which have been found to give good yields of citric acid by submereged fermentation techniques. In those examples in whch the cellular morphology is described the term "typical" refers to the short, stubby, forked, bulbous mycelial structure described in detail in United States Patent 2,492,667 as characterizing the acid-producing mycelium. The term "atypical" refers to the loose, filamentous mycelium with hyphae of little or no branching and tending to be pointed at the tips, and having the other characteristics of a non-acid-producing cellular structure described hereinbefore.

EXAMPLE 1

*Effect of iron on citric acid yields in highly purified sucrose media*

Sucrose ("Domino" brand) was dissolved in distilled water and the solution purified by passing it successively through beds of cation-exchange resin, anion-exchange resin, and mixed cation and anion-exchange resins. The resulting deionized sucrose solution had an electrical resistance of 3,600,000 ohms, and contained no detectable iron. To the purified sucrose solution was added the nutrient salts $KH_2PO_4$, $MgSO_4$ and $(NH_4)_2CO_3$ to produce a substrate having the following formulation in aqueous solution:

| | Percent |
|---|---|
| Sucrose | 14.2 |
| $KH_2PO_4$ | 0.014 |
| $MgSO_4 \cdot 7H_2O$ | 0.10 |
| $(NH_4)_2CO_3$ | 0.20 |

The pH of the substrate was adjusted to 2.6 with HCl, and the substrate was sterilized in steam jacketed autoclave in the conventional manner. Primary Standard iron wire was dissolved in hydrochloric acid and a quantity of the resulting solution was mixed with water which had been purified to a resistance of 4,000,000 ohms. Various amounts of the resulting standard iron solution were added to separate portions of the highly purified substrate, the several portions then being placed in column fermentors and the columns inoculated with spores of *Aspergillus niger*. The fermentations were permitted to proceed for 12 days, after which the media were analyzed for citric acid. The results of the fermentations are set out in Table 1 below:

TABLE 1

| Run No. | $Fe^{+++}$ (p.p.m.) | Citric Acid Yield, Percent |
|---|---|---|
| 1 | 0.0 | 67.0 |
| 2 | 0.05 | 73.0 |
| 3 | 0.50 | 88.0 |
| 4 | 0.75 | 79.0 |
| 5 | 1.00 | 76.0 |
| 6 | 2.00 | 71.0 |
| 7 | 5.00 | 57.0 |
| 8 | 10.00 | 39.0 |

An examination of the data set out in Table 1 shows that satisfactory citric acid yields were obtained with this highly purified sucrose medium having iron levels as high as 2.0 p.p.m., with optimum yields being obtained with iron in the vicinity of 0.5 p.p.m. Iron in excess of about 2.0 p.p.m. results in decreased yields of citric acid, indicating an undesirably high iron level.

EXAMPLE 2

*Effect of iron in the absence of copper on citric acid production in defecated decationized high test syrup media*

To show the effect of similar levels of iron on a fermentation of a substrate prepared from a crude sugar source, that is, a substrate which contains a substantial amount of the iron potentiators which enhance the deleterious effect of iron on citric acid yields, a defecated, decationized high test molasses containing 0.2 p.p.m. of iron was made up into a medium of the same composition as that described in Example 1, with the exception that the molasses sugars were substituted for the sucrose of Example 1. This high test molasses was prepared by clarifying and evaporating sugar cane juice to about 80% solids and inverting the resulting product with yeast to convert about 75% of the sucrose to invert sugar. Iron levels of separate portions of the medium were adjusted to the desired concentration by addition thereto of the same primary standard iron wire solution used in Example 1, and the several portions fermented as in Example 1. Data obtained in these fermentations are set out in Table 2.

TABLE 2

| Run No. | $Fe^{+++}$ (p.p.m.) | Citric Acid Yield | |
|---|---|---|---|
| 1 | 0.20 | nil | Mycelium in all runs became loose and filamentous after 24 hours of fermentation. |
| 2 | 0.50 | nil | |
| 3 | 0.75 | nil | |
| 4 | 1.00 | nil | |
| 5 | 2.00 | nil | |

An examination of the data in the above table shows that, with this substrate, levels of iron as low as 0.20 p.p.m. are sufficient to cause the development of a type of growth of the organism which results in no citric acid production.

EXAMPLE 3

*Effect of copper on citric acid yields in highly purified sucrose media*

To several portions of a medium having the composition of that described in Example 1 were added various amounts of a pure aqueous solution of copper sulfate, instead of the standard iron solution of Example 1, and the resulting media were inoculated with spores of *Aspergillus niger* and fermented in the same manner and for the same length of time described in Example 1. At the end of the 12-day period analyses of the media showed the following citric acid yields:

TABLE 3

| Run No. | $Cu^{++}$ (p.p.m.) | Citric Acid Yield, Percent |
|---|---|---|
| 1 | 0 | 67.0 |
| 2 | 0.05 | 44.0 |
| 3 | 0.10 | 34.0 |
| 4 | 0.50 | 20.0 |
| 5 | 1.00 | 28.0 |
| 6 | 2.00 | 21.0 |
| 7 | 10.0 | 16.0 |

The data in Table 3 show that the value of copper as a growth or nutrient factor is limited to trace quantities (i.e., up to about 0.05 p.p.m.). This finding is in agreement with the teachings of the prior art, which indicates that trace quantities of copper in the amount of about 0.01 to 0.06 p.p.m. are utilizable by the organism.

EXAMPLE 4

*Effect of copper on citric acid yields in undecationized corn sugar media*

A medium was prepared having the following composition in aqueous solution, the carbohydrate component being supplied by undecationized corn sugar:

| | |
|---|---|
| $(NH_4)_2CO_3$ | 0.2%. |
| $KH_2PO_4$ | 0.014%. |
| $MgSO_4$ | 0.1%. |
| $Fe^{+++}$ | .00008% (.8 p.p.m.). |
| Carbohydrate | 12.0–15.0%. |

The medium was adjusted to a pH of 2.5–2.65 with sulfuric acid and sterilized in a steam-jacketed autoclave in the usual manner. Portions of the medium were placed into column fermentors and the columns inoculated with spores of *Aspergillus niger*. The fermentations were permitted to proceed for 12 days, after which the media were analyzed for citric acid. The fermentation data are given in Table 4, wherein the yield of citric acid is expressed in grams (calculated as citric acid monohydrate) as well as in terms of the percentage of carbohydrate converted to citric acid. The conversion values are based on the initial concentration of fermentable carbohydrates as determined by the Somogyi method of sugar analysis.

TABLE 4

| Run No. | $Cu^{++}$, p.p.m. | Acidity, gm. | Initial Sugar, gm. | Conversion, percent | Cellular Morphology |
|---|---|---|---|---|---|
| 30 | 0.0 | 0.0 | 507 | | Atypical: filamentous non-acid-producing. |
| 38 | 5.0 | 213.0 | 507 | 42.0 | Compact to filamentous aggregates. |
| 39 | 10.0 | 207.0 | 507 | 40.0 | Do. |
| 40 | 20.0 | 367.0 | 507 | 72.4 | Typical: compact aggregates. |
| 41 | 40.0 | 339.0 | 502 | 67.5 | Do. |
| 42 | 80.0 | 346.0 | 502 | 69.2 | Do. |
| 43 | 160.0 | 407.0 | 502 | 81.1 | Do. |

EXAMPLE 5

*Effect of copper on citric acid yields in undecationized media containing added $Fe^{+++}$*

In another series of fermentations using undecationized corn sugar, the concentrations of copper and iron ions were allowed to vary in relation to each other. The results of such fermentations, using a basic sugar medium such as that employed in Example 4, are tabulated in Table 5 below:

TABLE 5

| Run No. | $Fe^{+++}$ (p.p.m.) | $Cu^{++}$, p.p.m. | Acidity (gm.) | Initial Sugar (gm.) | Conversion, Percent |
|---|---|---|---|---|---|
| 20 | 10.0 | 50.0 | 393.0 | 505.0 | 77.8 |
| | 50.0 | 50.0 | 349.0 | 505.0 | 69.1 |
| | 100.0 | 50.0 | 256.0 | 505.0 | 50.7 |
| | 150.0 | 50.0 | 62.0 | 505.0 | 14.2 |
| 21 | 10.0 | 100.0 | 380.0 | 505.0 | 77.4 |
| | 50.0 | 100.0 | 317.0 | 500.0 | 65.4 |
| | 100.0 | 100.0 | 272.0 | 505.0 | 53.9 |
| | 150.0 | 100.0 | 149.0 | 500.0 | 29.8 |
| 22 | 10.0 | 200.0 | 375.0 | 500.0 | 75.0 |
| | 50.0 | 200.0 | 341.0 | 500.0 | 68.2 |
| | 100.0 | 200.0 | 181.0 | 500.0 | 36.2 |
| | 150.0 | 200.0 | 68.0 | 500.0 | 13.6 |
| 23 | 10.0 | 300.0 | 378.0 | 500.0 | 75.6 |
| | 50.0 | 300.0 | 344.0 | 500.0 | 68.8 |
| | 100.0 | 300.0 | 274.0 | 500.0 | 54.8 |
| | 150.0 | 300.0 | 133.0 | 500.0 | 26.6 |
| 24 | 10.0 | 500.0 | 370.0 | 500.0 | 74.0 |
| | 50.0 | 500.0 | 327.0 | 500.0 | 65.4 |
| | 100.0 | 500.0 | 298.0 | 500.0 | 60.6 |
| | 150.0 | 500.0 | 138.0 | 500.0 | 27.6 |

EXAMPLE 6

*Effect on citric acid production of copper additions to decationized high test syrup media*

In this series of runs a number of commercial high test molasses of the type described in Example 2 were used as the carbohydrate sources. The molasses in each case was deionized by treatment in a cation-exchange resin bed, and the purified molasses diluted with water and combined with nutrient salts to form a medium having the following composition:

| | Percent |
|---|---|
| Sugar | 12–14 |
| $KH_2PO_4$ | 0.014 |
| $MgSO_4 \cdot 7H_2O$ | 0.10 |
| $(NH_4)_2CO_3$ | 0.20 |

The media were adjusted to a pH of 2.5–2.65, inoculated with *Aspergillus niger* spores, and the fermentations allowed to proceed for 7 to 9 days. In all these runs an initial addition of copper was made to the substrate (using copper sulfate as the source of copper ions) at the time of inoculation, the amount of copper added being based on the amount of iron ions present in the medium. The cellular morphology of the *Aspergillus niger* was examined as a routine measure about one day after inoculation, and again about two days after inoculation. After each examination if the morphology indicated the need for additional copper control, that is to say, if the growth of the mycelium appeared to be loose and filamentous, with hyphae of little or no branching and tending to be pointed at the tips, and if few or no chlamydospores appeared in the mycelium, an additional amount of copper sulfate was added. If, on the other hand, the morphology had the proper characteristics, that is to say, if the mycelium growth tended to be aggregated, and if the hyphae were short and stubby with slightly rounded or flattened tips with a great deal of branching, and if chlamydospores were formed or forming, no further copper addition was made. The data as to the iron levels, copper control required, and citric acid yields for these runs are set out below in Table 6:

TABLE 6.—EFFECT OF COPPER ADDITIONS TO DECATIONIZED HIGH TEST SYRUP MEDIA OF VARIOUS IRON LEVELS ON CITRIC ACID PRODUCTION

| Run No. | $Fe^{+++}$ (p.p.m.) | Copper Addition (p.p.m.) | | | | | Citric Acid Yield, Percent |
|---------|---------------------|--------------------------|---|---|---|---|----------------------------|
|         |                     | Initial                  | 2nd | | 3rd | | |
|         |                     |                          | Amt. | Time, Hrs. | Amt. | Time, Hrs. | |
| 604 | 4.9 | 2.5 | 50 | 25 | 25 | 48 | 75.2 |
| 608 | 0.9 | 5.0 | 20 | 46 | | | 70.4 |
| 610 | 1.25 | 5.0 | 50 | 48 | | | 74.4 |
| 632 | 1.26 | 10.0 | | | | | 58.4 |
| 634 | 1.10 | 10.0 | 25 | 48 | | | 83.1 |
| 637 | 1.10 | 10.0 | | | | | 77.0 |
| 640 | .66 | 5.0 | | | | | 68.9 |
| 644 | 1.99 | 5.0 | 10 | 21 | | | 60.2 |
| 646 | 2.0 | 10.0 | 50 | 48 | | | 76.1 |
| 661 | .78 | 10.0 | | | | | 71.8 |
| 663 | .80 | 5.0 | 25 | 37 | | | 75.3 |
| 696 | 0.4 | 5.0 | | | | | 80.0 |

The data in Table 6 illustrate the amount of copper necessary to control various levels of iron in a decationized high test molasses medium, and also illustrate that the amount of copper needed to control the fermentation is reduced as the concentration of iron ions present is reduced. The data further show that when the initial amount of added copper is not sufficient to counteract the effects of the iron present, further additions of copper may be made with good effect during the initial period of growth of the organism.

EXAMPLE 7

*Effect of copper on citric acid yields in decationized corn sugar media containing relatively large amounts of $Fe^{+++}$*

Corn sugar was deionized by treatment in a cation-exchange resin bed, and the purified corn sugar was used to prepare an aqueous medium to which 10 p.p.m. $Fe^{+++}$ was added. The medium had the following composition:

| | |
|---|---|
| $(NH_4)_2CO_3$ | 0.2%. |
| $KH_2PO_4$ | 0.014%. |
| $MgSO_4 \cdot 7H_2O$ | 0.1%. |
| $CaCl_2$ | 0.0006%. |
| $MoO_3$ | 0.005%. |
| Morpholine | 0.05%. |
| Carbohydrate (decationized) | 12.0–15.0%. |
| $Fe^{+++}$ | 0.001% (10 p.p.m.). |
| Water (decationized) | Remainder. |

The medium was adjusted to a pH of 2.5–2.65 with chemically pure hydrochloric acid, was sterilized in an autoclave and introduced into fermentation columns, and fermented with *Aspergillus niger* in the usual way. The results of these fermentations are given below in Table 7.

TABLE 7

| Run No. | $Cu^{++}$, p.p.m. | Acidity, gm. | Initial Sugar, gm. | Conversion, Percent | Cellular Morphology |
|---|---|---|---|---|---|
| 50 | 0.0 | 27.0 | 493 | 5.6 | Filamentous, very poor acid-producing cell material. |
| 51 | 5.0 | 145.0 | 493 | 29.4 | Filamentous to aggregative, poor acid-producing cell material. |
| 52 | 25.0 | 258.0 | 493 | 52.3 | Aggregative to filamentous, moderate acid-producing cell material. |
| 53 | 50.0 | 385.0 | 493 | 78.1 | Typical, good cell material. |
| 54 | 100.0 | 361.0 | 493 | 73.2 | Stunted compact aggregates, good acid-producing cell material. |

EXAMPLE 8

*Effect on citric acid production of copper additions to defecated decationized high test molasses media having various iron concentrations*

In this series of runs a number of different commercial high test molasses of the type used in Examples 2 and 6 were used as the carbohydrate sources. The molasses in each case was first defecated and then deionized by treatment in a cation-exchange resin bed. The defecation, accomplished by a method familiar in the art, removed a great number of the materials which augment the deleterious effect of iron on citric acid yields, and also enabled the deionization step to reduce substantially the concentration of iron ions in the medium. The fermentation runs with these media were set up and carried out in substantially the same manner as those described in Example 6. The data for these runs appear below in Table 8.

TABLE 8

| Run No. | $Fe^{+++}$ (p.p.m.) | Copper Addition (p.p.m.) | | | | | Citric Acid Yield, Percent |
|---------|---------------------|--------------------------|---|---|---|---|----------------------------|
|         |                     | Initial                  | 2nd | | 3rd | | |
|         |                     |                          | Amt. | Time | Amt. | Time | |
| 790 | 0.5 | 0.25 | | | | | 80.7 |
| 792 | 0.9 | 0.25 | 25 | 31 | | | 77.8 |
| 797 | 0.5 | 0.25 | 10 | 34 | | | 76.4 |
| 798 | 0.56 | 0.25 | 5 | 27 | | | 89.8 |
| 825 | 0.32 | 0.50 | | | | | 76.2 |
| 826 | 0.22 | 0.50 | | | | | 76.7 |
| 897 | 0.26 | 0.10 | | | | | 79.0 |
| 899 | 0.26 | 0.15 | | | | | 81.0 |
| 911 | 0.20 | 0.1 | | | | | 55.5 |
| 937 | 0.20 | 0.15 | | | | | 47.6 |
| 942 | 0.20 | 0.10 | | | | | 57.4 |
| 959 | 0.20 | 0.05 | | | | | 89.3 |
| 963 | 0.20 | 0.05 | | | | | 84.8 |
| 996 | 0.37 | 0.10 | | | | | 48.0 |
| 997 | 0.44 | 0.30 | | | | | 71.7 |
| (New Series) | | | | | | | |
| 1 | 0.45 | 0.10 | | | | | 71.6 |
| 2 | 0.44 | 0.20 | | | | | 78.3 |
| 3 | 0.43 | 0.30 | | | | | 78.1 |
| 13 | 0.44 | 0.20 | | | | | 76.9 |
| 273 | 0.78 | 0.5 | 50 | 72 | | | 0.0 |
| 282 | 0.60 | 1.0 | 10 | 31 | | | 65.0 |
| 287 | 0.82 | 0.6 | 5 | 23 | 5 | 35 | 76.2 |
| 283 | 0.63 | .6 | 5 | 23 | | | 72.0 |

The data in Table 8 show that relatively small amounts of copper are required to control the deleterious effect of iron at low concentrations of the latter in media prepared with defecated, decationized carbohydrate materials. Run 273 exemplifies an attempted fermentation wherein the initial copper addition was not sufficient to counteract the deleterious effects of the iron present, and the attempt to save the fermentation by adding a relatively large amount of copper (50 p.p.m.) 72 hours after inoculation (i.e., after the growth of the organism had been established) proved unsuccessful. A comparison of runs Nos. 911, 937, and 942, all of which had iron level of 0.20 p.p.m., shows that at this low iron level the desirable copper concentration is less than 0.1 p.p.m. and may approach the trace range as in runs Nos. 959 and 963.

EXAMPLE 9

*Defecated, decationized high test molasses without copper control*

A medium similar to those used in Example 8 was prepared having an initial sugar concentration of 18.94%, an iron concentration of 0.2 p.p.m., and a pH of 2.66. The medium was inoculated with spores of *Aspergillus niger* and fermentation begun as in the previous examples. After three days' fermentation the mycelium had abnormally developed to the point where aeration was grossly impaired. The fermentation was stopped and the substrate analyzed. It was found that no citric acid had been produced.

EXAMPLE 10

*Utility of various copper salts as iron antagonists*

An aqueous medium was prepared having the following composition wherein raw (undecationized) corn sugar was used as the carbohydrate source:

| | Percent |
|---|---|
| $(NH_4)_2CO_3$ | 0.200 |
| $KH_2PO_4$ | 0.014 |
| $MgSO_4 \cdot 7H_2O$ | 0.100 |
| $Zn++$ (as $ZnSO_4$) | 0.001 |
| Corn sugar (as dextrose) | 12.3 |
| Copper salts | Variable |
| pH (with HCl) | 2.55 |

The medium was sterilized in the usual way and dispensed in 4000 ml. quantities in Pyrex glass column fermentors. The ionic copper content of the medium was varied in the several columns as shown in the following table. At the time of the inoculation with *Aspergillus niger* spores the iron ion concentration of the medium was 1.5 p.p.m. Results of the fermentations are given below in Table 10.

TABLE 10

| Run No. | $Cu^{++}$, p.p.m. | Form of Copper Salt | Total Acidity, gm. | Conversion of Initial Sugar, Percent |
|---|---|---|---|---|
| 1 | 0.0 | | 12 | 2.4 |
| 2 | 50.0 | $CuSO_4 \cdot 5H_2O$ | 385 | 78.3 |
| 3 | 100.0 | $CuSO_4 \cdot 5H_2O$ | 382 | 77.6 |
| 4 | 50.0 | $Cu(NO_3)_2 \cdot 3H_2O$ | 390 | 79.3 |
| 5 | 100.0 | $Cu(NO_3)_2 \cdot 3H_2O$ | 382 | 77.6 |
| 6 | 50.0 | CuCl | 354 | 72.0 |
| 7 | 100.0 | CuCl | 334 | 67.9 |
| 8 | 50.0 | $CuCl_2 \cdot 2H_2O$ | 348 | 70.7 |
| 9 | [1] 100.0 | $CuCl_2 \cdot 2H_2O$ | 213 | 43.3 |
| 10 | 50.0 | CuCN | 358 | 72.8 |
| 11 | 100.0 | CuCN | 365 | 74.2 |
| 12 | 50.0 | $Cu(C_2H_3O_2)_2 \cdot H_2O$ | 353 | 71.8 |
| 13 | [1] 100.0 | $Cu(C_2H_3O_2)_2 \cdot H_2O$ | 268 | 54.5 |
| 14 | 50.0 | CuI | 381 | 77.4 |
| 15 | 100.0 | CuI | 380 | 77.2 |
| 16 | 50.0 | $CuCO_3 \cdot Cu(OH)_2$ | 360 | 73.2 |
| 17 | 100.0 | $CuCO_3 \cdot Cu(OH)_2$ | 357 | 72.3 |

[1] Portion of initial seed lost by foaming.

The data in Table 10 show that with media prepared with crude corn sugar, a concentration of 1.5 p.p.m. of iron, without control by copper ions, caused a complete fermentation failure. Only 12 grams of total acidity resulated, with a 2.4% conversion of the initial sugar to citric acid. The mycelium in run No. 1 was abundant and filamentous and completely devoid of chlamydospores—features characteristic of the cellular morphology of mycelia incapable of appreciable citric acid accumulation. In the remaining runs set forth in Table 10, wherein a number of different copper compounds were added to the several substrates to supply the ionic copper in accordance with the invention, the deleterious effect of the iron present on the cellular metabolism and morphology of the organism was effectively counteracted, and good yields of citric acid uniformly obtained.

In all of the foregoing examples, unless otherwise stated, the copper and iron components of the substrates were present therein prior to inoculation with the *Aspergillus niger* spores.

This application is a continuation-in-part of my application Serial No. 329,740, filed January 5, 1953, now abandoned, and of my application Serial No. 670,390, filed July 8, 1957, now U.S. Patent No. 2,916,420, the latter being a continuation-in-part of my application Serial No. 358,950, filed June 1, 1953, now abandoned.

What is claimed is:

1. In the production of critic acid by submerged fermentation with *Aspergillus niger* of a medium prepared with organic nutrient derived from an impure carbohydrate source and containing not less than 0.2 part of iron per million parts of said medium, the method of controlling the cellular metabolism of said *Aspergillus niger* which comprises incorporating in said medium ionic copper in an amount between about 0.1 and about 500 parts per million parts of said medium, the entire amount of said copper being incorporated in said medium prior to the expiration of the initial growth period of said *Aspergillus niger*.

2. The method according to claim 1 wherein at least a portion of said ionic copper is incorporated into said medium prior to inoculation of the medium with spores of said *Aspergillus niger*.

3. The method according to claim 1 wherein at least a portion of said ionic copper is incorporated into said medium at the time of inoculation of the medium with spores of said *Aspergillus niger*.

4. In the production of citric acid by the submerged fermentation with *Aspergillus niger* of a substrate prepared with organic nutrient derived from an impure carbohydrate source, and containing iron to the extent of not less than 0.2 part per million parts of said substrate, the improvement which comprises controlling the cellular morphology of the *Aspergillus niger* by the addition to said substrate of ionic copper within the initial period of about 50 hours after inoculation of said substrate with spores of *Aspergillus niger*, to induce an acid-producing cellular structure of said *Aspergillus niger* characterized by: (a) abnormally short, stubby, forked, bulbous mycelium; (b) numerous swollen, oval to spherical-shaped cells well distributed throughout the mycelial structure; (c) mycelial structures all showing granulation, and numerous vacuoles or refractile bodies; (d) absence of normal reproductive bodies (vesicles or sterigmata); (e) formation of compact aggregates or colonies having a gross granular appearance.

5. The method according to claim 4 wherein the addition of copper to said substrate is determined by changes in morphology of the *Aspergillus niger* during said initial period of about 50 hours, according to the following procedure: an initial addition of ionic copper to said substrate is made at the commencement of fermentation and the morphology of said *Aspergillus niger* is observed periodically after said copper addition; if after about 12 hours after said initial addition of copper the mycelial structure is loose and filamentous and substantially free of branching, additional ionic copper is added to said medium and further observations of the morphology of the organism are made thereafter at about 12-hour intervals during the remainder of said initial period of about 50 hours, further additions of ionic copper being made after each of said observations showing a loose and filamentous mycelial structure substantially free of branching, said copper additions being made in such quantities during said initial period of about 50 hours that said acid-producing structure of said organism is effected within said period.

6. A process in accordance with claim 1 wherein said carbohydrate source is selected from the group consisting of glucose, starch hydrolysates, invert sugars, aqueous vegetable extracts containing sugar, and sucrose sources, each of the members of said group being partially refined.

7. The process in accordance with claim 1 wherein said copper is supplied to said medium in the form of an aqueous solution of a soluble copper salt.

8. In the production of citric acid by fermenting a medium prepared with organic nutrient derived from an impure carbohydrate source, wherein said medium is inoculated with spores of *Aspergillus niger* and contains iron in an amount effective normally to promote a cellular metabolism of said *Aspergillus niger* favoring production of non-acid producing mycelium, the improvement which comprises incorporating in said medium ionic copper in an amount effective to overcome said effect of the iron on said *Aspergillus niger* and thereby promoting a cellular metabolism of the *Aspergillus niger* favoring production of citric acid-producing mycelium, the entire amount of said copper being incorporated in said medium prior to the expiration of the initial growth period of said *Aspergillus niger*.

References Cited in the file of this patent

UNITED STATES PATENTS

| | | |
|---|---|---|
| 2,353,771 | Szucs | July 18, 1944 |
| 2,364,701 | Eisenman et al. | Dec. 12, 1944 |

OTHER REFERENCES

The Botanical Review, vol. 5, No. 4, April 1939, pp. 208–210 and 229–230.

Journal Bacteriology, vol. 54, August 1947, pp. 161 to 167.

"Industrial Microbiology," Prescott et al., 2nd edition, McGraw-Hill Publishing Co. Inc., New York (1949), p. 576.

Chemical Abstracts, 1952, vol. 46, col. 577.

"Industrial Fermentation," Underkofler et al., vol. 1, Chemical Publishing Company, Inc., New York (1954), pp. 424 to 428.